United States Patent
Walser et al.

(10) Patent No.: US 6,731,998 B2
(45) Date of Patent: May 4, 2004

(54) COLLABORATIVELY SOLVING AN OPTIMIZATION PROBLEM USING FIRST AND SECOND OPTIMIZATION SOFTWARE EACH HAVING AT LEAST PARTIAL INFORMATION CONCERNING THE OPTIMIZATION PROBLEM

(75) Inventors: Joachim Paul Walser, Dallas, TX (US); David E. Joslin, Seattle, WA (US); Craig W. Schmidt, Somerville, MA (US)

(73) Assignee: i2 Technologies US, Inc., Dallas, TX (US)

(*) Notice: Subject to any disclaimer, the term of this patent is extended or adjusted under 35 U.S.C. 154(b) by 11 days.

(21) Appl. No.: 10/393,793

(22) Filed: Mar. 20, 2003

(65) Prior Publication Data

US 2003/0167098 A1 Sep. 4, 2003

Related U.S. Application Data

(63) Continuation of application No. 09/520,669, filed on Mar. 7, 2000, now Pat. No. 6,560,501.

(51) Int. Cl.[7] .............................................. G06F 19/00
(52) U.S. Cl. ............................ 700/99; 700/28; 700/102
(58) Field of Search ........................... 700/99, 97, 100, 700/106, 102, 28; 705/8, 7

(56) References Cited

U.S. PATENT DOCUMENTS

| | | | |
|---|---|---|---|
| 5,280,425 A | 1/1994 | Hogge | 364/402 |
| 5,319,781 A | 6/1994 | Syswerda | 395/650 |
| 5,408,663 A | 4/1995 | Miller | 395/650 |
| 5,548,518 A | 8/1996 | Dietrich et al. | 364/468 |
| 5,715,165 A | 2/1998 | Luh et al. | 364/474.15 |
| 5,983,195 A | 11/1999 | Fierro | 705/10 |
| 6,038,540 A * | 3/2000 | Krist et al. | 705/8 |
| 6,041,267 A | 3/2000 | Dangat et al. | 700/107 |
| 6,278,901 B1 | 8/2001 | Winner et al. | 700/99 |
| 6,321,133 B1 | 11/2001 | Smirnov et al. | 700/100 |
| 6,434,435 B1 * | 8/2002 | Tubel et al. | 700/30 |
| 6,549,879 B1 * | 4/2003 | Cullick et al. | 703/10 |

FOREIGN PATENT DOCUMENTS

EP    0 364 090 A2    8/1989

OTHER PUBLICATIONS

S. C. .K. Chu, *A mathematical programming approach towards optimized master production scheduling*, Int. Journal of Production Economics 38 (1995), pp. 269–279, Feb. 15, 1994.

(List continued on next page.)

*Primary Examiner*—Leo Picard
*Assistant Examiner*—Kidest Bahta
(74) *Attorney, Agent, or Firm*—Baker Botts L.L.P.

(57) ABSTRACT

In one embodiment, a method is provided for collaboratively solving an optimization problem using at least first optimization software and second optimization software each having at least partial information concerning the optimization problem. The method includes: (1) determining a solution to a first sub-problem of the optimization problem using the first optimization software based on the at least partial information concerning the optimization problem known to the first optimization software; (2) communicating from the first optimization software to the second optimization software the solution to the first sub-problem and information concerning one or more penalties for deviating from the solution to the first sub-problem; and (3) determining a solution to a second sub-problem using the second optimization software based on the at least partial information concerning the optimization problem known to the second optimization software, the communicated solution to the first sub-problem, and the communicated information concerning one or more penalties for deviating from the solution to the first sub-problem.

21 Claims, 3 Drawing Sheets

OTHER PUBLICATIONS

S. K. Das et al., *An integrated approach to solving the master aggregate scheduling problem*, Int. Journal of Production econmics 34 (1994), pp. 167–178, May 2, 1990.

W. G. M. Rutten et al., *Balancing stocks, flexible recipe costs and high service level requirements in a batch process industry: A study of a small scale model*, European Journal of Operational Research 110 (1998), pp. 626–642, Feb. 20, 1996.

C. Jordan et al., *Discrete lotsizing and scheduling by batch sequencing*, Working Paper, Christian–Albrechts–Universitaet at Kiel, Apr. 1995.

M. H. Bassett, *Using detailed scheduling to obtain realistic operating policies for a batch processing facility*, Ind. Eng. Chem. Res., 36, pp. 1717–1726, 1997.

R. Z. Rios–Mercado et al., *Heuristics for the flowline problem with setup costs*, European Journal of Operational Research 110, pp. 76–98, Aug. 1, 1996.

A. Drexl et al., *Lot sizing and scheduling—survey and extensions*, European Journal of Operational Research 99, pp. 221–235, Dec. 3, 1996.

Y. H. Lee et al., *Scheduling jobs on parallel machines with sequence–dependent setup times*, European Journal of Operational Research 100, pp. 464–474, Sep. 27, 1994.

L. J. LeBlanc et al., *Formulating and solving production planning problems*, European Journal of Operational Research 112, pp. 54–80, Oct. 1, 1995.

J. F. Goncalves et al., *A hybrid heuristic and linear programming approach to multi–product machine scheduling*, European Journal of Operational Research 110, pp. 548–563, Oct. 1, 1996.

K. Aardal, *Reformulation of capacitated facility Locations problems: How redundant information can help*, Annals of Operations Research 82, pp. 289–308, 1998.

D. E. Joslin et al., *Squeaky–Wheel Optimization*, Journal of Artificlal Intelligence Research, vol. 10, pp. 353–373, Aug. 1998.

J. M. Crawford et al., *Abstract Local Search*, In Proceedings of the AIPS–98 Workshop on Planning as Combinatorial Search (held in conjunction with the Fourth International Conference on Artificial Intelligence Planning Systems, AIPS–98), Pittsburgh, 1998.

J. M. Pinto et al., "STBS: A Continuous Time MILP Optimization for Short Term Scheduling of Batch Plants," Computers and Chemical Engineering, vol. 22, pp. 1297–1308, Dec. 17, 1997.

A. Villa ", Distributed architecture for production planning and control in discrete manufacturing," Computer Integrated Manufacturing, 0–8186–0888–9/88/0000/0357/$01.00 IEEE, pp. 357–366 May 1988.

Bazaraa, et al., "Seven: The Decomposition Principle," Linear programming and network flows, John Wiley & Sons, USA, pp. 320–321, XP–002244935 Undated.

PCT, Notification of Transmittal of the International Search Report or the Declaration, 7 pgs. Jul. 15, 2003.

* cited by examiner

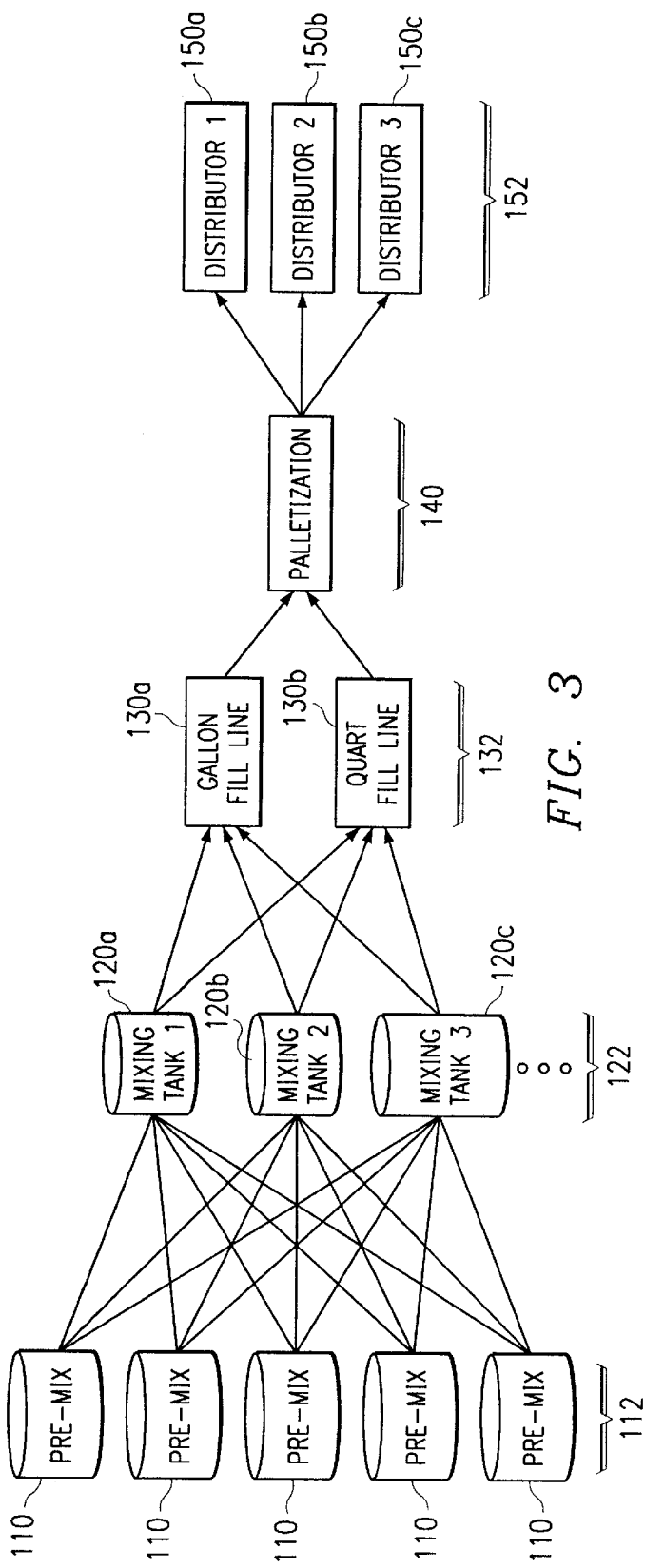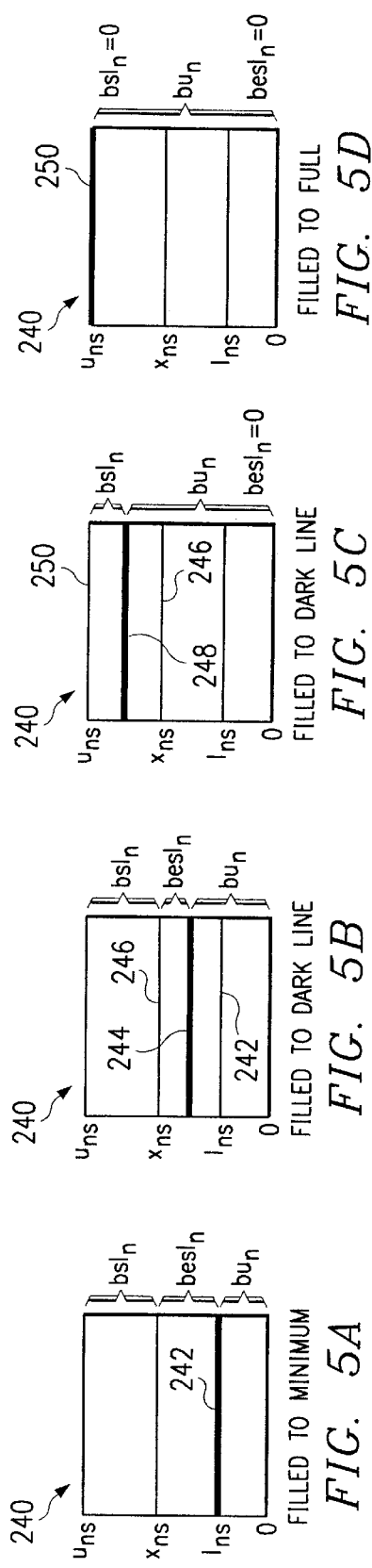

COLLABORATIVELY SOLVING AN OPTIMIZATION PROBLEM USING FIRST AND SECOND OPTIMIZATION SOFTWARE EACH HAVING AT LEAST PARTIAL INFORMATION CONCERNING THE OPTIMIZATION PROBLEM

RELATED APPLICATION

This application is a continuation of U.S. application Ser. No. 09/520,669, filed Mar. 7, 2000, entitled "System and Method for Collaborative Batch Aggregation and Scheduling now U.S. Pat. No. 6,560,501."

TECHNICAL FIELD OF THE INVENTION

This invention relates generally to the field of optimization, and more particularly to collaboratively solving an optimization problem using first and second optimization software each having at least partial information concerning the optimization problem.

BACKGROUND OF THE INVENTION

The manufacture of products or other items commonly involves a multi-stage process that includes the use of equipment of various capacities. In such a multi-stage, variable equipment size process, product or end-item demands are often aggregated or split into manufacturing batches in order to fit the available equipment sizes. The scheduling of these batches must account for the complex factory flows between the manufacturing stages and as well as various business rules unique to the particular industry involved. If the manufacturing process is used to produce multiple products, the scheduling process also preferably minimizes sequence-dependent equipment changeovers between the scheduled batches.

Computer implemented planning and scheduling systems are often used for manufacturing and other supply chain planning functions. In general, such systems can model the manufacturing and related environments and provide plans or schedules for producing items to fulfill consumer demand within the constraints of the environment. Existing scheduling systems, however, typically cannot handle variable equipment sizes or make optimal batching decisions using a number of different criteria. Often a manual heuristic scheme is used, based on the personal expertise of a human operator, to divide demand for a product into batches of a single size and to schedule the batches. However, these heuristic schemes often lead to unsatisfactory factory schedules in terms of under-utilized resources, late deliveries, excess inventories, and overall unbalanced factories. Moreover, they necessarily require a person with detailed knowledge of and extensive experience with the manufacturing process for which the batch aggregation and scheduling is required. These and other deficiencies make previous systems and methods for aggregating and scheduling batches inadequate for many purposes.

SUMMARY OF THE INVENTION

According to the present invention, disadvantages and problems associated with previous optimization techniques may be reduced or eliminated.

In one embodiment, a method is provided for collaboratively solving an optimization problem using at least first optimization software and second optimization software each having at least partial information concerning the optimization problem. The method includes: (1) determining a solution to a first sub-problem of the optimization problem using the first optimization software based on the at least partial information concerning the optimization problem known to the first optimization software; (2) communicating from the first optimization software to the second optimization software the solution to the first sub-problem and information concerning one or more penalties for deviating from the solution to the first sub-problem; and (3) determining a solution to a second sub-problem of the optimization problem using the second optimization software based on the at least partial information concerning the optimization problem known to the second optimization software, the communicated solution to the first sub-problem, and the communicated information concerning one or more penalties for deviating from the solution to the first sub-problem.

In a more particular embodiment, the first optimization software includes batch aggregation software operable to aggregate product batches according to one or more aggregation criteria and the second optimization software includes scheduling software operable to schedule the aggregated product batches according to one or more scheduling criteria.

Particular embodiments of the present invention may provide one or more technical advantages. For example, according to decisions and associated feedback they communicate to one another, the first and second optimization software may collaborate to provide a suitable solution, such as an aggregation and scheduling solution where the first optimization software includes batch aggregation software and the second optimization software includes scheduling software. Certain particular embodiments may allow demands for a product or other item to be aggregated into or split between batches, while also allowing the batches to be scheduled in a manner that increases factory throughput and reduces manufacturing costs. Certain particular embodiments may be capable of aggregating batches of variable size across multiple production stages and computing material flows between these stages. By allowing for variable batch sizes, certain particular embodiments may enable the use of a variety of equipment sizes in the manufacturing process and optimizes the use of each of these equipment sizes. Certain particular embodiments may also reduce the quantity of work-in-process, minimize end-item inventory, and reduce product shortages and late deliveries. Certain particular embodiments may also be used to optimize other manufacturing and supply chain planning processes, according to particular needs. One or more other technical advantages may be readily apparent to those skilled in the art from the figures, descriptions, and claims included herein.

BRIEF DESCRIPTION OF THE DRAWINGS

To provide a more complete understanding of the present invention and further features and advantages thereof, reference is now made to the following description taken in conjunction with the accompanying drawings, in which:

FIG. 3 illustrates an example workflow to which a collaborative batch aggregation and scheduling process may be applied;

FIGS. 5A–5D illustrate the relationship between example variables and parameters for use in a collaborative batch aggregation and scheduling process.

DETAILED DESCRIPTION OF THE INVENTION

Figure 1:
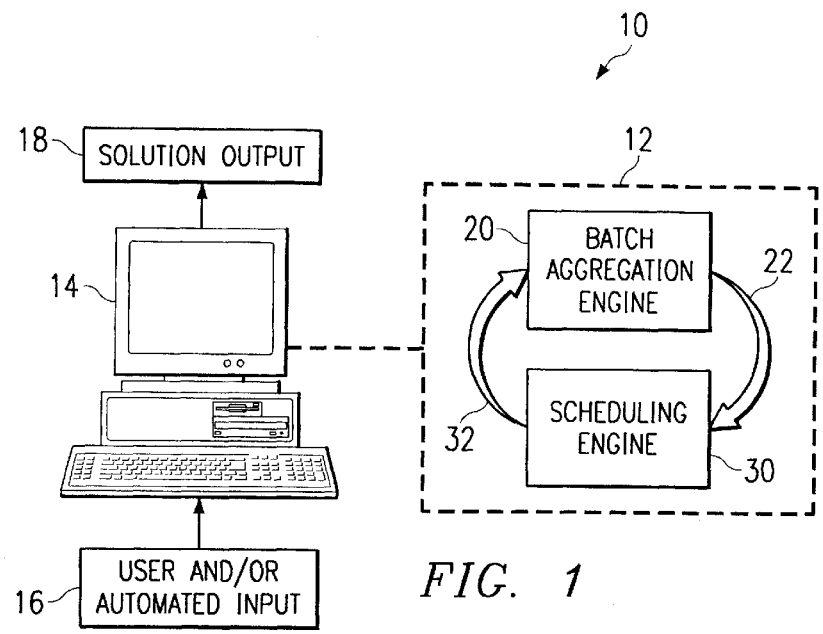
FIG. 1 illustrates an example system that executes a collaborative batch aggregation and scheduling process to optimize the manufacture of an item.

FIG. 1 illustrates an example system 10 that executes a collaborative batch aggregation and scheduling process 12 to optimize the manufacture, packaging, or other handling of a product. The term "product" should be interpreted to encompass any appropriate item or component that might be subject to batch aggregation and scheduling, including any unfinished item or component associated with any stage in a manufacturing, packaging, or other appropriate process. In one embodiment, process 12 involves two engines: a batch aggregation engine 20 and a scheduling engine 30. Batch aggregation engine 20 creates and aggregates product batches according to suitable aggregation criteria described more fully below. All forms of the term "aggregate" should be interpreted to include splitting or dividing a product demand between multiple batches, as well as combining product demands into a batch. In one embodiment, as described more fully below, batch aggregation engine 20 uses mixed-integer linear programming (MILP) to optimize the aggregation of product demands into batches to meet various manufacturing, shipping, customer or other related criteria.

Scheduling engine 30 schedules the aggregated batches according to suitable scheduling criteria. Scheduling engine 30 may include a task-based scheduling system suitable for handling scheduling constraints and minimizing sequence-dependent set-ups, for example only and not by way of limitation, the RHYTHM OPTIMAL SCHEDULER produced by i2 TECHNOLOGIES, INC. and described in U.S. Pat. No. 5,319,781. Batch aggregation engine 20 and scheduling engine 30 cooperate in a collaborative cycle in which the output 22 of aggregation engine 20 serves as input to scheduling engine 30, and the output 32 of scheduling engine 30 serves as input to aggregation engine 20. Such a combination of similarly collaborating engines may be used according to the present invention to optimize the manufacture, packaging, or other handling of any suitable product that is created in batches. Those skilled in the art will appreciate that the present invention may also be used for batch aggregation, scheduling, or both batch aggregation and scheduling in other supply chain planning applications (for example, aggregating and scheduling shipments of products), and that the present invention encompasses all such applications. In addition, batch aggregation engine 20 and scheduling engine 30 may be thought of generically as two optimization engines having partial information about an overall optimization problem. Each engine solves a sub-problem of the overall problem based on its partial information, and the two engines collaboratively pass the solutions to their sub-problems until a sufficiently optimal solution to the overall optimization problem is obtained. Any number of such optimization engines collaboratively working to solve an optimization problem are encompassed by the present invention.

Engines 20 and 30 may operate on one or more computers 14 at one or more locations. Computer 14 may include a suitable input device, such as a keypad, mouse, touch screen, microphone, or other device to input information. An output device may convey information associated with the operation of engines 20 and 30, including digital or analog data, visual information, or audio information. Computer 14 may include fixed or removable storage media, such as magnetic computer disks, CD-ROM, or other suitable media to receive output from and provide input to engines 20 and 30. Computer 14 may include a processor and volatile or non-volatile memory to execute instructions and manipulate information according to the operation of engines 20 and 30. Although only a single computer 14 is shown, engines 20 and 30 may each operate on separate computers 14, or may operate on one or more shared computers 14, without departing from the intended scope of the present invention.

User or automated input 16 may be provided to engines 20 and 30 for use in batch aggregation and scheduling. For example, input 16 may include information about the available capacity and set-up of manufacturing equipment that is entered by a user or automatically supplied by the equipment itself (for example, through the use of sensors). Input 16 may also include one or more demands for a product, the "soft" and "hard" dates by which the demanded product is to be delivered or shipped, and appropriate business rules that affect the manufacturing process (for example, the severity of shipping a particular order late or the cost of storing inventory of a product). As described below, process 12 uses input 16 to aggregate and schedule product batches according to the operation of collaborating engines 20 and 30. The resulting solution, which may include a schedule for making a series of product batches of various sizes using various pieces of equipment, may then be provided to a user, a manufacturing control computer, or any other suitable device related to the manufacturing process as output 18.

Figure 2:
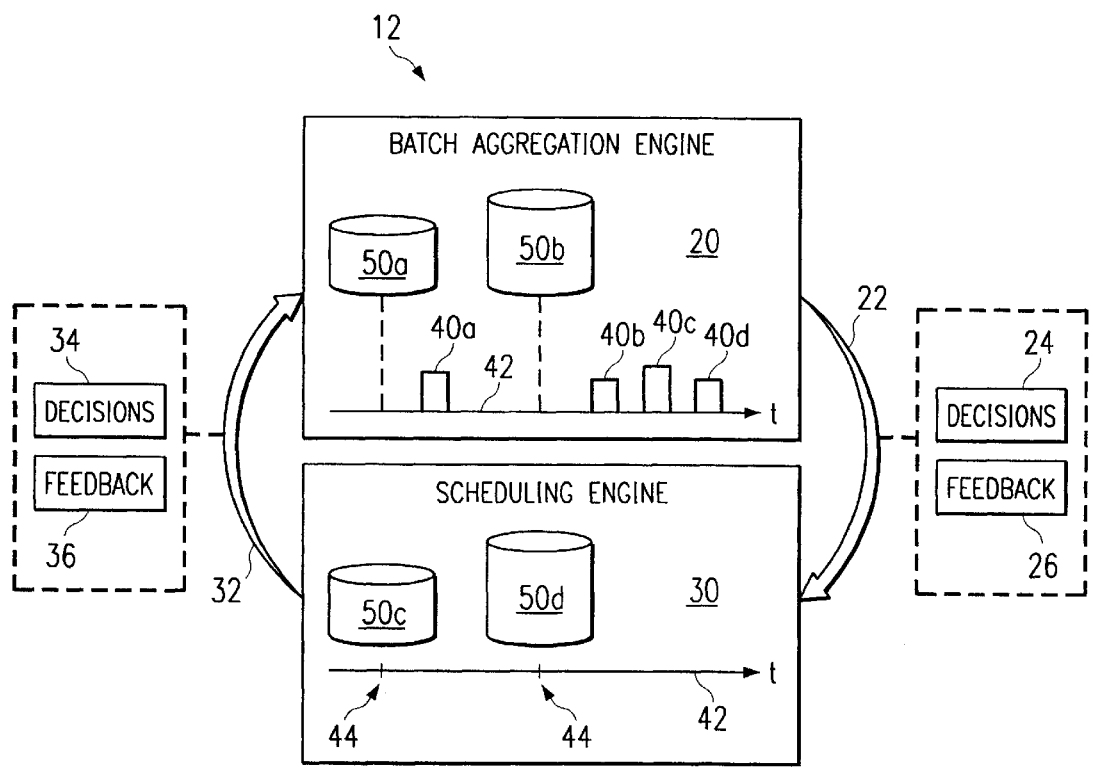
FIG. 2 illustrates an example collaborative batch aggregation and scheduling process.

FIG. 2 illustrates an example collaborative batch aggregation and scheduling process 12. As described above, batch aggregation engine 20 and scheduling engine 30 cooperate in a collaborative cycle to reach a suitably optimal solution. Within process 12, batch aggregation engine 20 and scheduling engine 30 iteratively attempt to optimize their respective solutions to the overall aggregation and scheduling problem by sharing their respective outputs 22 and 32. Batch aggregation engine 20 communicates output 22 in the form of decisions 24 and feedback 26 relating to decisions 24. Scheduling engine 30 communicates output 32 in the form of decisions 34 and feedback 36 relating to decisions 34. For example, decisions 24 that batch aggregation engine 20 may output may include one or more suggested start times and sizes for each aggregated batch. Decisions 34 output by scheduling engine 30 may include at least one scheduled start time and size for each batch. However, not all decisions 24 made by batch aggregation engine 20 typically need to be or even can be followed by scheduling engine 30. Similarly, not all of the decisions 34 made by scheduling engine 30 typically need to be or even can be followed by batch aggregation engine 20. Each of the engines 20 and 30 is suited to optimize one part of the overall solution, but neither may be able to optimally solve the overall problem by itself. According to the present invention, engines 20 and 30 cooperate to solve the problem and allow appropriate decisions to be made by the best-qualified engine.

For engines 20 and 30 to collaboratively determine a suitably optimal solution, each engine 20 and 30 may pass various penalties as feedback 26 and 36, respectively, relating to its decisions 24 and 34, respectively, that indicate the relative severity of or are otherwise associated with deviating from those decisions. The engine 20 and 30 receiving these penalties weighs the penalties against the information of which it is aware when determining its own decisions 24 and 34, respectively. By iteratively passing decisions and penalties associated with deviating from these decisions, each engine 20 and 30 can thereby influence the decisions of the other engine to collaboratively optimize the manufacturing process.

As an example, assume that there are a series of expected demands 40 for a product over a time horizon 42. Each demand 40 may be associated with an order placed by a customer to be delivered at a particular time in time horizon 42. Batch aggregation engine 20 initially generates a sequence of batches 50 from which to meet demands 40 and determines which demand or demands 40 each batch will be used to meet. In the particular example illustrated in FIG. 2, batch aggregation engine 20 determines that demand 40a will be met from batch 50a, which has a suggested size and a suggested start time along time horizon 42. Similarly, batch aggregation engine 20 initially determines that demands 40b, 40c and 40d will all be met from a single batch 50b, which has a suggested size and a suggested start time that is later in time horizon 42 than the suggested start time for batch 50a. The sizes of batches 50a and 50b may be different, reflecting different sizes of equipment associated with the manufacture of batches 50a and 50b.

To make these initial decisions 24, batch aggregation engine 20 typically will have information about product demands 40 and about the equipment available to make product batches 50 to meet demands 40. Batch aggregation engine 20 sends decisions 24 to scheduling engine 30 and, together with or separate from decision 24, also sends feedback 26 in the form of one or more penalties indicating the severity of or otherwise associated with deviating from at least one of the suggested batch sizes or starting times. For example, penalties 26 may include, but are not limited to, a penalty for scheduling a particular batch 50 such that a particular demand 40 is not timely met, a penalty for scheduling a particular batch 50 such that the resulting product will have to be held as inventory before being delivered to the customer or other entity demanding the product, a penalty for using a single batch 50 to meet a demand 40 for two or more packaging sizes, and a penalty for partially utilizing a shipping pallet to meet a demand 40. Other suitable penalties 26 are described in further detail below, although the present invention is intended to encompass all appropriate penalties, whether or not specifically described herein.

After scheduling engine 30 receives the initial decisions 24 and penalties 26 from batch aggregation engine 20, scheduling engine 30 schedules batches 50c and 50d of specified sizes (which may or may not be the sizes suggested by batch aggregation engine 20) to begin at specific times 44 along time horizon 42. Scheduling engine 30 determines the actual starting times of batches 50c and 50d according to the suggested start times and sizes received from batch aggregation engine 20, the penalties associated with deviating from these suggested sizes and times, and other information scheduling engine 30 may have about the problem, such as the availability of resources, capacity and current set-up state of production equipment, changeover costs associated with changing the current set-up state, labor constraints, material availability, and any other suitable information. Although two batches 50c and 50d are illustrated, scheduling engine 30 may schedule more or fewer batches 50 according to particular needs. Scheduling engine 30 schedules the aggregated batches 50, but may have the flexibility not to schedule one or more batches 50. Scheduling engine 30 then sends the actual scheduled starting times of the suggested batch sizes, the actual scheduled starting times and batch sizes of batches not suggested by engine 20, or any combination of these as decisions 34 to batch aggregation engine 20, together with or separate from feedback 36 in the form of one or more appropriate penalties associated with deviating from the scheduled times, sizes, or both times and sizes. In one embodiment, such penalties may discourage the use of over-utilized production resources, may encourage the use of under-utilized resources, may relate to peggings between upstream and downstream batches, or may relate to the compatibility of batches with demands or the compatibility of batches with downstream batches. As an example, penalties 36 may include, but are not limited to, a penalty for deviating from a certain scheduled batch size to encourage the full use of one or more pieces of production equipment over a specified time period or a penalty associated with the changeover time or cost associated with changing the type of product manufactured in a particular piece of manufacturing equipment. Other suitable penalties, whether or not relating to the capacity and operation of the manufacturing equipment or other resources, may be used instead of or in addition to the penalties described above.

The collaborative batch aggregation and scheduling process 12 iterates in a loop until a suitably optimal solution is achieved (for example, when the solutions from each engine 20 and 30 have sufficiently converged or a predetermined number of iterations has been reached). Given the decisions 34 and feedback 36 from scheduling engine 30, batch aggregation engine 20 can re-aggregate demands 40 into batches 50 to achieve a revised solution that is closer to optimal. Batch aggregation engine 20 may output this revised solution as decisions 24 and feedback 26, to be followed by rescheduling and output of a revised solution as decision 34 and feedback 36 from scheduling engine 30. The present invention contemplates some or all of decisions 24 and feedback 26 from batch aggregation engine 20, or decisions 34 and feedback 36 from scheduling engine 30, remaining unchanged from one iteration to the next, as appropriate. The best overall solution to the problem may be stored in memory and provided to a user or a manufacturing-related device (either after meeting a predetermined threshold or after a predetermined number of iterations). In this manner, the iterative process provides for collaborative optimization between possibly very different engines that are applied to solve separate, but related, portions of a larger optimization problem (for example, batch aggregation versus scheduling). Furthermore, although the above example describes a single-stage (product batch to end-item demand) and single-product manufacturing process, process 12 can be advantageously applied to any suitable multi-stage and multi-product manufacturing and shipping problem as described below.

FIG. 3 illustrates an example workflow 100 used in the manufacture, packaging, and shipping of paint, to which the collaborative batch aggregation and scheduling process 12 of the present invention may be applied. Although the example described below involves the manufacture, packaging, and shipping of paint, any other appropriate workflow involving the aggregation of any product, item, or component into batches may also be optimized using the present invention. In the illustrated embodiment, workflow 100 begins with a pre-mix stage 112 that employs a number of pre-mix tanks 110. Pre-mix tanks 110 are used to prepare materials to be used in a subsequent paint mixing stage 122. Mixing stage 122 employs a collection of mixing tanks 120 that each mix materials from the pre-mix stage to form selected colors of paint. The paint colors are typically dependant on the types of pre-mix materials used in mixing stage 122. In workflow 100, there are three mixing tanks 120a, 120b, and 120c which may be used to simultaneously mix different (or the same) colors of paint. After the paint has been mixed, it is routed to fill stage 132 to be placed in containers using one or more fill lines 130. In workflow 100, there are two fill lines: a gallon fill line 130a and a quart fill line 130b, although any suitable number of fill lines 130 could be used according to particular needs. Therefore, in this particular example, the various colors of paint mixed in mixing stage 122 can be placed in either one-gallon or one-quart containers. After the paint has been packaged at fill stage 132, the filled paint containers are transported to a palletization stage 140 to be grouped and palletized for shipping to a number of distributors 150 at distribution stage 152.

Workflow 100 therefore presents an example multi-stage (for example, pre-mix, mix, fill, palletization, distribution, or any other suitable combination of stages) and multi-product (for example, various combinations of chemical consistency, color, fill container size, and any other suitable product variables) manufacturing process. Although the end-item demands 40 for workflow 100 are the orders of each distributor 150 for the paint products, each stage in workflow 100 may be considered to place a demand 40 for the "product" from the previous stage. In addition, although not illustrated, workflow 100 may include other suitable stages, such as the supply of raw materials to the pre-mix stage and the supply of paint to retail customers from distributors 150.

Collaborative batch aggregation and scheduling process 12 may be used to compute material flows across these various stages and to assign or "peg" downstream demands 40 (either demands for a finished product or demands for batches of an unfinished product associated with one of these stages) to upstream batches 50 while meeting appropriate business rules and optimization criteria. In one embodiment, batch aggregation engine 20 is used to aggregate demands 40 into batches 50 according to one or more appropriate cost criteria. For example, and not by way of limitation, engine 20 may aggregate batches 50 so as to minimize product shortages and product inventory ("just in time" manufacturing), avoid pallet fragmentation (only one partial pallet per batch 50), meet demand from multiple distributors evenly, or minimize split-fills (using a batch 50 to fill multiple container sizes), singly or in any suitable combination. Output 22 of batch aggregation engine 20, including decisions 24 and feedback 26, is provided to scheduling engine 30, which may tentatively schedule batches 50 so as to minimize sequence-dependent set-up times, minimize costs, maximize throughput, or meet any other suitable objective or objectives. Scheduling engine 30 may provide this suggested schedule to batch aggregation engine 20, as decisions 34 and feedback 36. As described above, batch aggregation engine may use this information to re-optimize the batch aggregation solution. This cycle is continued according to the present invention until an optimal or sufficiently optimal solution is obtained, or until a predetermined number of iterations is reached.

Figure 4:
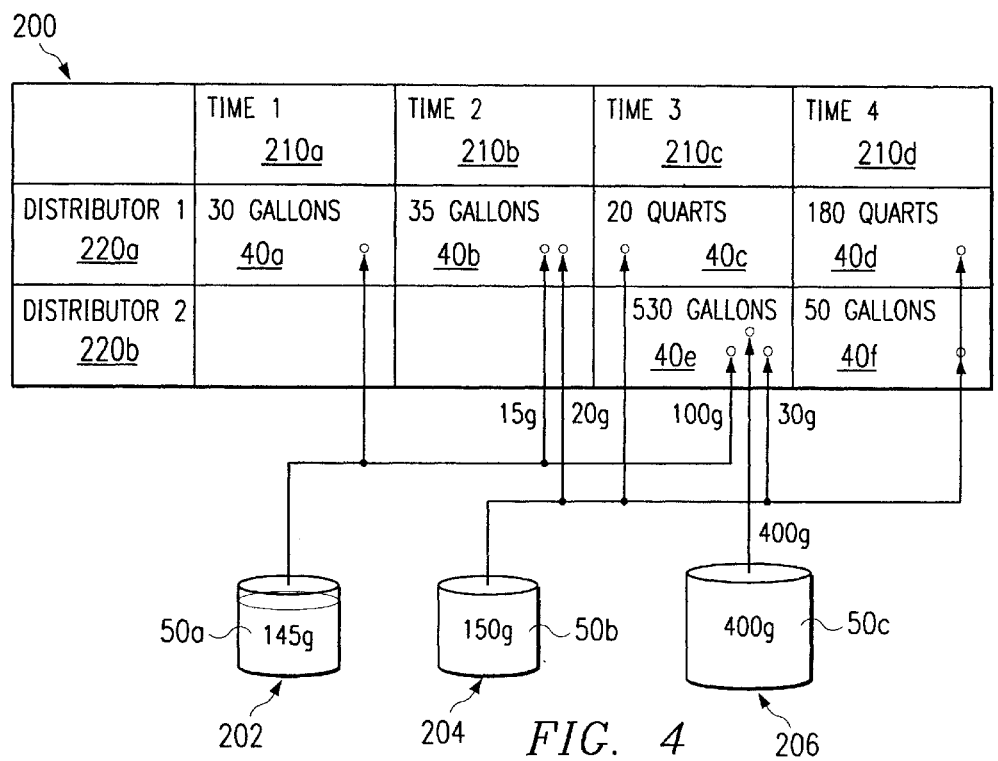
FIG. 4 illustrates an example allocation of demands to batches using a collaborative batch aggregation and scheduling process.

FIG. 4 illustrates an example allocation of demands 40 to batches 50 that might be obtained using batch aggregation engine 20, again using the paint manufacturing process as merely an illustrative example. A table 200 is used to illustrate demands 40 at four time slots 210 for a particular color of paint. Demands 40 are made in this case by two paint distributors 220a and 220b, although more or fewer distributors may be involved according to particular needs. To meet demands 40, batch aggregation engine 20 creates three different paint batches 50a, 50b, and 50c. Batches 50a and 50b are each manufactured in 150-gallon mixing tanks 202 and 204, respectively. Batch 50c is manufactured in a 400-gallon mixing tank 206. Batch 50a totals 145 gallons, such that a small portion of the capacity of tank 202 remains unused. Batches 50b and 50c use the entire capacity of their respective tanks 204 and 206, and thus total 150-gallons and 400-gallons, respectively. The example batch aggregation of FIG. 4 has taken palletization into account by minimizing partially-filled pallets (assuming the pallet size of both gallon and quart pallets is twenty units per pallet.)

As illustrated in FIG. 4, batches 50a and 50b are each used to meet multiple product demands 40 which arise from multiple distributors 220. These demands 40 are also for multiple container sizes and for different time slots 210. Specifically, batch 50a is used to meet all 30-gallons of demand 40a, 15-gallons of demand 40b, and 100-gallons of demand 40e. Batch 50b is used to meet the other 20 gallons of demand 40b, all 20 quarts (5 gallons) of demand 40c, all 180-quarts (45 gallons) of demand 40d, 30-gallons of demand 40e, and all 50-gallons of demand 40f. Batch 50c, on the other hand, is used to meet only one demand 40 from one distributor 220 for one container size. Specifically, batch 50c is used to meet the remaining 400-gallons of demand 40e.

As described above, such an allocation or aggregation of demands 40 into batches 50 may be obtained using an MILP model in batch aggregation engine 20. A significant advantage of an MILP approach over manual or other heuristic aggregation techniques is that it allows for a declarative yet flexible formulation of customer-specific aggregation rules and objectives. To use the MILP approach, the problem is preferably broken down into aggregation classes, which in the case of example workflow 100 may each be a particular color of paint for which there is a demand 50 on time horizon 42. Thus, for each color of paint, batch aggregation engine 20 may separately aggregate the product demands 40 (of each of the stages) into batches 50.

In the initial aggregation phase (the first iteration in the cycle of process 12), no batches 50 may yet exist. Therefore, new batches 50 need to be created before assigning demands 40 to batches 50. One complication related to the creation of batches 50 is the fact that workflow 100 may contain tanks of different sizes. Therefore, the batch size generally cannot be specified before a tank is assigned. To optimize batch scheduling, it is preferable that scheduling engine 30 retains the flexibility to assign batches 50 to tanks according to the actual or projected workloads of the tanks. Thus, by deferring to scheduling engine 30 the decision of which batches 50 of a given paint color to schedule, better results may be achieved in terms of throughput since the workload may be balanced across the different equipment sizes. To accomplish this, batch aggregation engine 20 may create a variety of different sizes of batches 50 and prepare a batch penalty table, described more fully below, for each batch 50 to assist scheduling engine 30 in scheduling batch 50. For demands 40 that have been aggregated to batches 50 but for which scheduling engine 30 has decided not to schedule or to schedule late with respect to their associated due dates, re-aggregation by aggregation engine 20 offers the chance to eventually meet all demands 40 timely in the final schedule by re-pegging those demands 40 to the batches 50 that have been scheduled.

In one embodiment, the integrated problem of batch creation, batch sizing, and demand aggregation is approached by creating empty batches 50 that are fixed in time but variable in size (referred to as flex-batches) during a heuristic pre-processing stage. The flex-batches are input to batch aggregation engine 20, which determines the size (possibly zero) of the flex-batches and allocates demands 40 to batches 50 while keeping the starting times of the flex-batches fixed. The freedom that engine 20 has to determine the allocations depends on how many flex-batches are created in the pre-processing stage. In general, the greater number of flex-batches created (for example, creating a flex-batch for every minute on time horizon 42 versus creating a flex-batch for every day on time horizon 42), the more freedom engine 20 has to assign demands 40 to batches 50. However, increased freedom may be associated with an increased processing time, since the determination as to which of the excess batches 50 to leave empty typically enlarges the complexity of the calculations.

Once the flex-batches have been created, batch aggregation engine 20 may use the following example MILP model to optimize the batch aggregation process for workflow 100. In a particular embodiment, the model defines the following indices or sets (which are provided as examples and should not be interpreted as limiting the model) to be used in the calculations as follows:

| | |
|---|---|
| $i \in P$ | Pre-mix batches |
| $j \in M$ | Mix batches |
| $n \in P \cup M$ | Overall batches, including pre-mix batches and mix batches |
| $k \in D$ | Demands, either make to stock or make to order |
| $k \in D_f \subseteq D$ | Demands of fill size f |
| $f \in F$ | Fill sizes for packing |
| $s \in S_n \subseteq S$ | Possible sizes for batch n (currently $S_n = S$). |

The following parameters (which are provided as examples and should not be interpreted as limiting the model) may be used by the model and values for these parameters input to engine 20:

| Name | Description |
|---|---|
| $d_k$ | Size of demand k |
| $ru_k$ | Maximum roundup demand allowed with demand k |
| $u_{ns}$ | Possible sizes of batch n |
| $x_{ns}$ | Lower limit on amount of batch that can be used without "excess" slack penalty |
| $l_{ns}$ | Lowest limit on amount of batch used, if batch is of size s (a physical constraint) Note: $l_{ns} \leq x_{ns} \leq u_{ns}$ |
| $u_n = \max_s u_{ns}$ | Maximum possible size of batch n |
| $bsl_n^{max} = \max_s (u_{ns} - x_{ns})$ | |
| $besl_n^{max} = \max_s (x_{ns} - l_{ns})$ | |
| asp | Maximum number of split fills allowed per batch |
| $t_k$ | Due date of demand k |
| $t_n$ | Time when the batch is scheduled (for inventory and lateness calculations) |
| $b_{ij}$ | Material expansion factor for pre-mix i to mix j |

The following variables (which are provided as examples and should not be interpreted as limiting the model) may be used in the model's objectives (which are described below):

| Name | Domain | Description |
|---|---|---|
| $bs_n$ | $[0, u_n]$ | Batch size available |
| $bu_n$ | $[0, u_n]$ | Batch size actually used |
| $bsl_n$ | $[0, bsl_n^{max}]$ | Allowable batch slack |
| $besl_n$ | $[0, besl_n^{max}]$ | Excess slack above maximum |
| $bb_{ns}$ | $\{0,1\}$ | Batch size binary |
| $pm_{ij}$ | $[0; u_n]$ | Amount of pre-mix batch i supplied to mix batch j |
| $md_{jk}$ | $[0, \min(u_n, d_k)]$ | Amount of mix batch j supplied to demand k |
| $r_k$ | $[0, ru_k]$ | Roundup or phantom demand allowed with demand k (may be 0) |
| $mf_{jf}$ | $\{0,1\}$ | Mix batch j includes SKUs f pack (fill) size f |
| $mef_j$ | $[0, |F|\text{-asp}]$ | Number of split fills exceeding asp in mix batch j, where $|F|$ is the size of set F. |

FIGS. 5A–5D illustrate several of the above variables and parameters relating to the batch sizes and the amount of batch slack (the amount of unused capacity of a pre-mix or mixing tank). FIG. 5A shows the relationship between these variables when a tank 240 (either a pre-mix or a mixing tank) is filled to a minimum operational level 242. FIG. 5B shows the relationship between these variables when tank 240 is filled to a level 244 above minimum operational level 242, but below a preferable minimum level 246. FIG. 5C shows the relationship between these variables when tank 240 is filled to a level 248 above preferable minimum level 246, but below a maximum operational level 250. FIG. 5D shows the relationship between these variables when tank 240 is filled to maximum operational level 250.

The following weights (which are provided as examples and should not be interpreted as limiting the model) may also be included in the model objectives. The weights are each given a value according to particular needs and are input into batch aggregation engine 20:

| Name | Description |
|---|---|
| wpl | Pre-mix earliness |
| wpe | Mix earliness |
| $wml_k$ | Lateness for demand k |
| $wme_k$ | Earliness for demand k |
| wps | Pre-mix slack |
| wpes | Pre-mix excess slack |
| wms | Mix slack |
| wmes | Mix excess slack |
| wf | Split fills |
| wef | Excess split fills |
| $wr_k$ | Roundup or phantom demand |
| $wpbb_s$ | Price for using any pre-mix batch of size s |
| $wmbb_s$ | Price for using any mix batch of size s |

Note: $wpbb_s$ and $wmbb_s$ are used to balance the equipment load across sizes

In one embodiment, after suitable parameters and weights have been input to batch aggregation engine 20, engine 20 aggregates demands 40 into batches 50 such that the sum of the following objectives (which are provided as examples and should not be interpreted as limiting the model) are minimized:

| | | |
|---|---|---|
| 1. | $wpl \sum_{i \in P} \sum_{j \in M: t_i > t_j} (t_i - t_j) \cdot pm_{ij}$ | Lateness of pre-mix batches (delays mix batch processing) |
| 2. | $wpe \sum_{i \in P} \sum_{j \in M: t_i < t_j} (t_j - t_i) \cdot pm_{ij}$ | Earliness (work-in-process) of pre-mix batches |
| 3. | $\sum_{k \in D} wml_k \sum_{j \in M: t_j > t_k} (t_j - t_k) \cdot md_{jk}$ | Lateness of mix batches (penalty will differ for orders and stock) |
| 4. | $\sum_{k \in D} wme_k \sum_{j \in M: t_j < t_k} (t_k - t_j) \cdot md_{jk}$ | Earliness (end-item inventory) of mix batches |
| 5. | $wf \sum_{j \in M} \sum_{f \in F} mf_{jf} + wef \sum_{j \in M} mef_j$ | Split fills, plus excess split fills |
| 6. | $\sum_{k \in D} wr_k r_k$ | Roundup/phantom inventory |
| 7. | $wps \sum_{i \in P} bsl_i + wpes \sum_{i \in P} besl_i$ | Slacks of partially filled pre-mixing tanks |
| 8. | $wms \sum_{j \in M} bsl_j + wmes \sum_{j \in M} besl_j$ | Slacks of partially filled mixing tanks |
| 9. | $\sum_{i \in P} \sum_{s \in S_i} wpbb_s \cdot bb_{is}$ | Cost for using a pre-mix batch of size s |
| 10. | $\sum_{j \in M} \sum_{s \in S_j} wmbb_s \cdot bb_{js}$ | Cost for using a mix batch of size s |

In one embodiment, batch aggregation engine 20 operates to minimize the sum of one or more of these or other suitable objectives. When determining, in a particular embodiment, the optimal batch aggregation using these objectives, the following constraints (which are provided as examples and should not be interpreted as limiting the model) may be followed:

Constraints on All Batches

| | | |
|---|---|---|
| 1. | $bs_n = bu_n + bsl_n + besl_n \quad \forall n \in P \cup M$ | Size of batch is amount used + slack + excess slack |
| 2. | $bs_n = \sum_{s \in S_n} u_{ns} \cdot bb_{ns} \quad \forall n \in P \cup B$ | Size of each batch depends on the binary selected |
| 3. | $l_{ns} bb_{ns} \leq bu_n \quad \forall n \in P \cup B, s \in S_n$ | Amount of batch used must meet minimum if it is that size |
| 4. | $bsl_n \leq (u_{ns} - x_{ns}) bb_{ns}$ $\forall n \in P \cup B, s \in S_n$ | Upper limit on $bsl_n$, depending on batch size |
| 5. | $besl_n \leq (x_{ns} - l_{ns}) bb_{ns}$ $\forall n \in P \cup B, s \in S_n$ | Upper limit on $besl_n$ |
| 6. | $\sum_{s \in S_n} bb_{ns} \leq 1 \quad \forall n \in P \cup B$ | At most one size variable can be selected |

Constraints on mix batches

| | | |
|---|---|---|
| 1. | $bu_j = \sum_{k \in D} md_{jk} \quad \forall j \in M$ | Sum of mix batch used must equal total demand supplied |
| 2. | $bu_j = \sum_{i \in P} b_{ij} pm_{ij}, \quad \forall j \in M$ | Mix batch used equals scaled amount of pre-mix batch |
| 3. | $\sum_{k \in D_f} md_{jk} \leq u_j mf_{jf} \quad \forall j \in M, f \in F$ | The $md_{jk}$ variable is 1 if there is a fill of that size |
| 4. | $\sum_{f \in F} mf_{jf} - asp \leq mef_j \quad \forall j \in M$ | No more than asp fill sizes per batch (split-fills) |

Constraints on pre-mix batches

| | | |
|---|---|---|
| 1. | $bu_i = \sum_{j \in M} pm_{ij} \quad \forall i \in P$ | Pre-mix batch used is sum supplied to mix batches |
| 2. | $\sum_{j \in M} md_{jk} = d_k + r_k, \quad \forall k \in N$ | Supply total demand for order + roundup (phantom demand that is created) |

Using the model described above, in which the sum of the objectives may be minimized according to appropriate constraints, batch aggregation engine 20 is able to aggregate demands 40 for a color of paint (or any other suitable product, item, or component) into batches 50 of different discrete sizes by optimizing material flows across several production stages. The model allows for flexible batch sizes that are desirable for handling different tank fill-levels and minimizing batch slacks. Using the model, batch aggregation engine 20 also helps to reduce the amount of work-in-process, minimize end-item inventory, reduce shortages and lateness of deliveries and reduce split fills. The model described above may be extended, as appropriate, to compute an allocation of pallets to batches 50, minimize partial pallets, and maximize the fairness or equality between supplies to different distributors.

After batch aggregation engine 20 has performed the optimization described above, engine 20 outputs to scheduling engine 30, as decisions 24, the created batches 50 with suggested starting times for each batch 50 that was created. In addition to the suggested batch starting times and sizes, engine 20 outputs feedback 26, in the form of penalties or otherwise, for each batch 50 to be used by scheduling engine 30. Penalties may be communicated to scheduling engine 30 individually or in the form of one or more penalty tables or other groupings.

Figure 6:
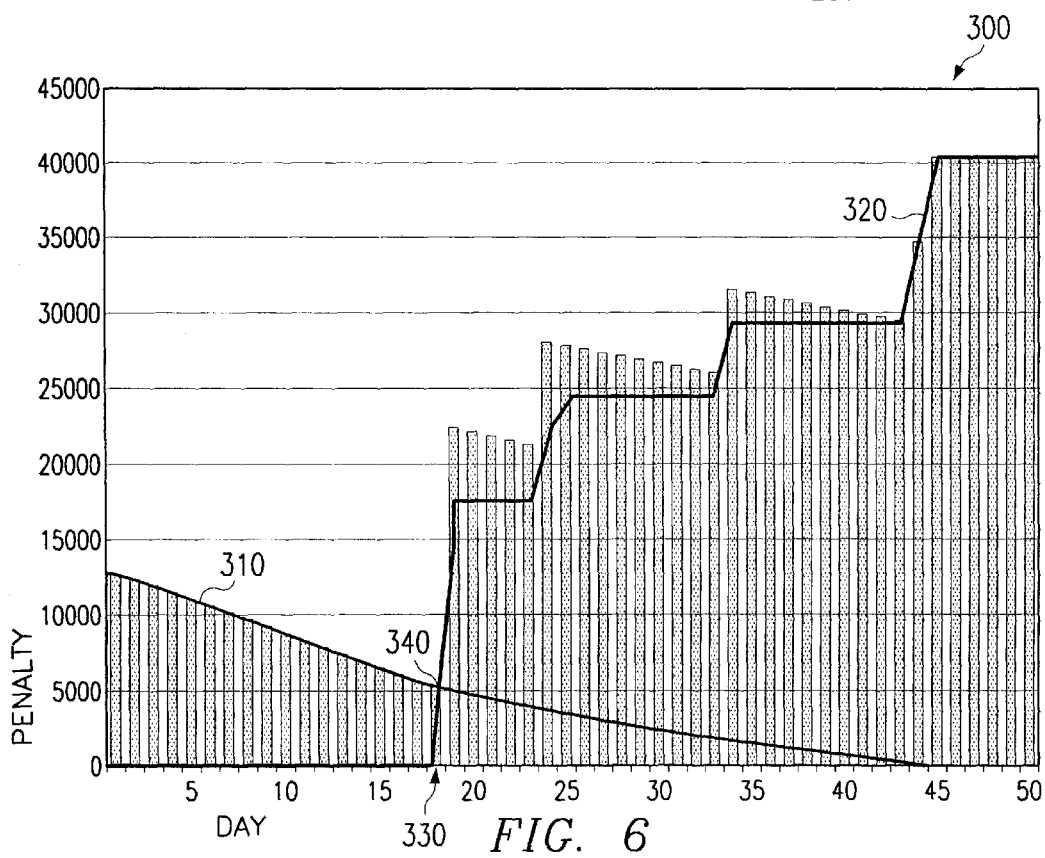
FIG. 6 illustrates an example penalty table for use in a collaborative batch aggregation and scheduling process.

FIG. 6 illustrates an example penalty table 300 produced by batch aggregation engine 20 that provides information to scheduling engine 30 regarding the effect of deviating from the suggested starting time for a particular batch 50. Penalty table 300 is a mapping of penalty values over time for batch 50. In the illustrated embodiment, penalty table 300 includes penalties indicating the effect on the amount of product shortage and product inventory of moving the starting time of batch 50. However, penalty table 300 may include one or more penalties (instead of or in addition to those described above) associated with any suitable variable or criterion considered by batch aggregation engine 20. Penalty table 300 illustrates that as the batch manufacturing time progresses, the overall inventory penalty decreases. The present invention contemplates penalty table 300 of any suitable shape according to one or more appropriate business rules. For example, if a business rule specifies that no late deliveries are to be made, then as manufacturing time progresses and due dates are missed, the overall slope of the inventory penalty decreases. Conversely, as manufacturing time progresses and "soft" due dates are missed, the shortage penalty slope 320 increases (due to costs associated with missing deadlines). Using penalty table 300 according to the present invention, scheduling engine 30 (which may not otherwise have efficient access to accurate information about shortage and inventory costs) is able to determine the effect that scheduling batch 50 at a particular time has on shortage and inventory costs.

For example, assuming all other criteria considered by batch aggregation engine 20 are equal, engine 20 would typically suggest that batch 50 associated with penalty table 300 be scheduled for a time 330 when the combination of shortage penalty 310 and inventory penalty 320—the composite penalty 340—is minimized. Batch aggregation engine 20 outputs the suggested size and time of batch 50 to scheduling engine 30 along with penalty table 300. Through the use of penalty table 300, scheduling engine 30 is able to acquire knowledge about the shortage and inventory costs associated with scheduling batch 50 at any time during the time range provided in penalty table 300. Using this information, scheduling engine 30 can determine the severity (in terms of the effect on inventory and shortage costs) of deviating from the starting time suggested by batch aggregation engine 20 and can determine whether other factors known to scheduling engine 30 (such as the set-up or capacity of the manufacturing equipment, for example) nevertheless warrant moving the starting time of the batch 50 from the suggested starting time to another starting time. Similar determinations as to batch size may be made according to an appropriate penalty table 300, together with or separate from the determination of the starting time.

As described above, scheduling engine 30 may include a scheduling system such as the RHYTHM OPTIMAL SCHEDULER produced by i2 TECHNOLOGIES, INC. and described in U.S. Pat. No. 5,319,781. Another suitable scheduling engine 30 is described in co-pending U.S. patent application Ser. No. 09/325,937, entitled "Computer Implemented Scheduling System and Process Using Abstract Local Search Technique." Any suitable scheduling engine 30 may be employed without departing from the intended scope of the present invention.

In summary, scheduling engine 30 receives suggested batch sizes and starting times as decisions 24 from batch aggregation engine 20, together with or separate from one or more penalty tables 300 or other suitable feedback 26. If batch aggregation and scheduling for more than one product is being performed, batch aggregation engine 20 may separately calculate and output the suggested batch sizes and batch starting times for each product. The present invention contemplates batch aggregation engine 20 aggregating multiple batches serially, substantially simultaneously, or in any other suitable manner. Based on this input, scheduling engine 30 determines and schedules actual starting times for batches 50 to be used to meet demands 40. If batch aggregation and scheduling is to be performed for more than one product type produced on the same equipment (for example, multiple colors of paint), scheduling engine 30 may concurrently schedule the batches for all products types (so as to properly allocate equipment used in manufacturing all such product types). The present invention contemplates scheduling engine 30 scheduling multiple batches serially, substantially simultaneously, or in any other suitable manner.

The scheduled values for batch starting times (and possibly for batch sizes that were not suggested) are communicated as decisions 34 to batch aggregation engine 20, together with or separately from one or more penalties or other feedback 36 suitable to provide engine 20 with knowledge relating to the information that scheduling engine 30 used to schedule the batches, and to influence batch aggregation engine accordingly. For example only and not by way of limitation, if scheduling engine 30 left a batch 50 suggested by batch aggregation engine 20 unscheduled because that size of manufacturing equipment is fully utilized, then scheduling engine 30 may output a penalty to batch aggregation engine 20 encouraging the creation of batches 50 in sizes that are under-utilized in the schedule. Other penalties based on the criteria considered by scheduling engine 30 may be communicated to batch aggregation engine 20 in addition to or instead of the example penalties described above, and the penalties may be combined in one or more penalty tables 300 for communication to batch aggregation engine 20.

As described above, engines 20 and 30 pass their respective decisions 24 and 34, respectively, and feedback 26 and 36 (in the form of penalties or otherwise), respectively, to each other in an iterative cycle. With each iteration, the batch aggregation and scheduling solution to a particular series of demands over time horizon 42 will typically converge until a solution is obtained that reflects the relative weights of all the criteria considered by engines 20 and 30. Furthermore, to encourage convergence, each engine 20 and 30 may increase with each iteration the penalties associated with deviating from its decisions 24 and 34, respectively, such that after a finite number of iterations a sufficiently optimal solution may become "locked in" and be produced as output 18.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for collaboratively solving an optimization problem using at least first optimization software and second optimization software each having at least partial information concerning the optimization problem, comprising:

determining a solution to a first sub-problem of the optimization problem using the first optimization software based on the at least partial information concerning the optimization problem known to the first optimization software;

communicating from the first optimization software to the second optimization software the solution to the first sub-problem and information concerning one or more penalties for deviating from the solution to the first sub-problem; and determining a solution to a second sub-problem of the optimization problem using the second optimization software based on the at least partial information concerning the optimization problem known to the second optimization software, the communicated solution to the first sub-problem, and the communicated information concerning one or more penalties for deviating from the solution to the first sub-problem.

2. The method of claim 1, further comprising:

communicating from the second optimization software to third optimization software the solution to the second sub-problem and information concerning one or more penalties for deviating from the solution to the second sub-problem; and determining a solution to a third sub-problem of the optimization problem using the third optimization software based on at least partial information concerning the optimization problem known to the third optimization software, the communicated solution to the second sub-problem, and the communicated information concerning one or more penalties for deviating from the solution to the second sub-problem.

3. The method of claim 2, wherein:
the first and third optimization software are different optimization software; and
the first and third sub-problems are different sub-problems.

4. The method of claim 2, wherein:
the first and third optimization software are the same optimization software;
the first and third sub-problems are the same sub-problem; and
solutions to sub-problems of the optimization problem are determined repeatedly in an iterative manner using the first, second, and third optimization software until a sufficiently optimal solution to the optimization problem is obtained.

5. The method of claim 2, further comprising:
determining solutions to one or more successive sub-problems of the optimization problem using one or more successive optimization software until last optimization software has determined a solution to a last sub-problem;
communicating from the last optimization software to the first optimization software the solution to the last sub-problem and information concerning one or more penalties for deviating from the solution to the last sub-problem; and
repeating the preceding steps in an iterative manner until a sufficiently optimal solution to the optimization problem is obtained.

6. The method of claim 1, wherein:
the first optimization software comprises batch aggregation software operable to aggregate product batches according to one or more aggregation criteria; and
the second optimization software comprises scheduling software operable to schedule the aggregated product batches according to one or more scheduling criteria.

7. The method of claim 1, wherein:
the first optimization software comprises batch aggregation software operable to allocate one or more product demands to one or more product batches having suggested sizes and suggested starting times, the solution to the first-sub problem comprising suggested sizes and suggested starting times;
the second optimization software comprises scheduling software operable to schedule starting times for one or more of the product batches, the solution to the second-sub problem comprising the starting times for the one or more product batches; and
the one or more penalties comprise penalties for deviating from at least one of the suggested sizes or at least one of the suggested starting times.

8. A system for collaboratively solving an optimization problem, comprising:
first optimization software operable to:
determine a solution to a first sub-problem of the optimization problem based on at least partial information concerning the optimization problem known to the first optimization software; and
communicate the solution to the first sub-problem and information concerning one or more penalties for deviating from the solution to the first sub-problem; and second optimization software operable to:
determine a solution to a second sub-problem of the optimization problem based on at least partial information concerning the optimization problem known to the second optimization software, the communicated solution to the first sub-problem, and the communicated information concerning one or more penalties for deviating from the solution to the first sub-problem.

9. The system of claim 8, wherein:
the second optimization software is further operable to communicate the solution to the second sub-problem and information concerning one or more penalties for deviating from the solution to the second sub-problem; and
the system further comprises third optimization software operable to determine a solution to a third sub-problem of the optimization problem based on at least partial information concerning the optimization problem known to the third optimization software, the communicated solution to the second sub-problem, and the communicated information concerning one or more penalties for deviating from the solution to the second sub-problem.

10. The system of claim 9, wherein:
the first and third optimization software are different optimization software; and
the first and third sub-problems are different sub-problems.

11. The system of claim 9, wherein:
the first and third optimization software are the same optimization software;
the first and third sub-problems are the same sub-problem; and
solutions to sub-problems of the optimization problem are determined repeatedly in an iterative manner using the first, second, and third optimization software until a sufficiently optimal solution to the optimization problem is obtained.

12. The system of claim 9, further comprising one or more successive optimization software including at least last optimization software wherein:
solutions are determined to one or more successive sub-problems of the optimization problem using the one or more successive optimization software until the last optimization software has determined a solution to a last sub-problem;
the solution to the last sub-problem and information concerning one or more penalties for deviating from the solution to the last sub-problem are communicated from the last optimization software to the first optimization software; and
the preceding operations are repeated in an iterative manner until a sufficiently optimal solution to the optimization problem is obtained.

13. The system of claim 8, wherein:
the first optimization software comprises batch aggregation software that aggregates product batches according to one or more aggregation criteria; and
the second optimization software comprises scheduling software that schedules the aggregated product batches according to one or more scheduling criteria.

14. The system of claim 8, wherein:
the first optimization software comprises batch aggregation software that allocates one or more product demands to one or more product batches having suggested sizes and suggested starting times, the solution to the first-sub problem comprising suggested sizes and suggested starting times;

the second optimization software comprises scheduling software that schedules starting times for one or more of the product batches, the solution to the second-sub problem comprising the starting times for the one or more product batches; and the one or more penalties comprise penalties for deviating from at least one of the suggested sizes or at least one of the suggested starting times.

15. Software for collaboratively solving an optimization problem, the software comprising at least first optimization software and second optimization software each having at least partial information concerning the optimization problem, the software embodied in computer-readable media and when executed operable to:

determine a solution to a first sub-problem of the optimization problem using the first optimization software based on at least partial information concerning the optimization problem known to the first optimization software;

communicate from the first optimization software to the second optimization software the solution to the first sub-problem and information concerning one or more penalties for deviating from the solution to the first sub-problem; and determine a solution to a second sub-problem of the optimization problem using the second optimization software based on at least partial information concerning the optimization problem known to the second optimization software, the communicated solution to the first sub-problem, and the communicated information concerning one or more penalties for deviating from the solution to the first sub-problem.

16. The software of claim 15, further operable to:

communicate from the second optimization software to third optimization software the solution to the second sub-problem and information concerning one or more penalties for deviating from the solution to the second sub-problem; and determine a solution to a third sub-problem of the optimization problem using the third optimization software based on at least partial information concerning the optimization problem known to the third optimization software, the communicated solution to the second sub-problem, and the communicated information concerning one or more penalties for deviating from the solution to the second sub-problem.

17. The software of claim 16, wherein:

the first and third optimization software are different optimization software; and the first and third sub-problems are different sub-problems.

18. The software of claim 16, wherein:

the first and third optimization software are the same optimization software;

the first and third sub-problems are the same sub-problem; and solutions to sub-problems of the optimization problem are determined repeatedly in an iterative manner using the first, second, and third optimization software until a sufficiently optimal solution to the optimization problem is obtained.

19. The software of claim 16, further comprising one or more successive optimization software including at least last optimization software and operable to:

determine solutions to one or more successive sub-problems of the optimization problem using the one or more successive optimization software until the last optimization software has determined a solution to a last sub-problem;

communicate from the last optimization software to the first optimization software the solution to the last sub-problem and information concerning one or more penalties for deviating from the solution to the last sub-problem; and repeat the preceding steps in an iterative manner until a sufficiently optimal solution to the optimization problem is obtained.

20. The software of claim 15, wherein:

the first optimization software comprises batch aggregation software operable to aggregate product batches according to one or more aggregation criteria; and the second optimization software comprises scheduling software operable to schedule the aggregated product batches according to one or more scheduling criteria.

21. The software of claim 15, wherein:

the first optimization software comprises batch aggregation software operable to allocate one or more product demands to one or more product batches having suggested sizes and suggested starting times, the solution to the first-sub problem comprising suggested sizes and suggested starting times;

the second optimization software comprises scheduling software operable to schedule starting times for one or more of the product batches, the solution to the second-sub problem comprising the starting times for the one or more product batches; and the one or more penalties comprise penalties for deviating from at least one of the suggested sizes or at least one of the suggested starting times.

* * * * *